(12) United States Patent
Konapelsky et al.

(10) Patent No.: US 7,042,393 B1
(45) Date of Patent: May 9, 2006

(54) THINNED ARRAY ANTENNA SYSTEM

(75) Inventors: Richard S. Konapelsky, Columbia, MD (US); John Wojtowicz, Hampstead, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/227,111

(22) Filed: Sep. 16, 2005

(51) Int. Cl.
*G01S 5/02* (2006.01)

(52) U.S. Cl. .................. 342/424; 342/372; 342/373

(58) Field of Classification Search .......... 342/154, 342/157, 368, 372, 373, 424, 427
See application file for complete search history.

(56) References Cited

U.S. PATENT DOCUMENTS 6,661,376 B1 * 12/2003 Maceo et al. .......... 342/373

2005/0162305 A1 * 7/2005 Wells .......... 342/357.02

* cited by examiner

*Primary Examiner*—Dao Phan
(74) *Attorney, Agent, or Firm*—Birch, Stewart, Kolasch & Birch, LLP

(57) ABSTRACT

An antenna comprised of a plurality of identical subarrays each having N antenna elements. The antenna elements of a core of subarrays all contribute outputs which are used for forming sum and difference beams. A peripheral area surrounding the core has subarrays which have a lesser number of antenna elements which participate in the signal processing operation to derive the sum and difference beams. The antenna elements of each subarray are combined in a manifold having one output, for the peripheral subarrays, and three outputs for the core subarrays. The manifold outputs are provided to various digital receivers which process the manifold signals with predetermined weighting functions. A digital beamformer processes the digital receiver outputs to derive the sum and difference beams which are used by a radar processor for tracking targets.

5 Claims, 11 Drawing Sheets

THINNED ARRAY ANTENNA SYSTEM

BACKGROUND OF THE INVENTION

1. Field of the Invention

The invention in general relates to a phased array antenna, and more particularly to thinned array comprised of subarrays for tracking targets.

2. Description of Related Art

Extremely large antenna arrays exist for tracking targets such as missiles. These arrays must provide high transmit/receive sensitivity as well as high angular accuracy. Further, in order to prevent jamming and to reduce clutter, the antenna beams must have very low sidelobes and no grating lobes. The antenna system of the present invention meets these requirements.

SUMMARY OF THE INVENTION

The present invention is a thinned antenna array having identical subarrays in a core area and in a peripheral area surrounding the core. Each subarray includes antenna elements with all of the antenna elements of the core subarrays being active and participating in signal processing operations, while less than all of the antenna elements in the peripheral area participate in signal processing operations. The active antenna elements of a subarray have their antenna signals combined in a manifold that provides, for peripheral subarrays, at least a first output signal, and for core subarrays, three output signals. The manifold output signals are provided to respective first, second and third digital receivers, each for converting the RF antenna output to digital form and to apply a predetermined weighting function to the result. All of the first digital receiver outputs are utilized in a digital beamformer to generate a sum beam. The outputs of the first and second digital receiver are used by the beamformer to generate an azimuth difference beam and the outputs of the first and third digital receiver are used by the beamformer to generate an elevation difference beam. These beams may then be used by a radar processor to track targets.

Further scope of applicability of the present invention will become apparent from the detailed description provided hereinafter. It should be understood, however, that the detailed description and specific example, while disclosing the preferred embodiment of the invention, is provided by way of illustration only, since various changes and modifications within the spirit and scope of the invention will become apparent to those skilled in the art, from the detailed description.

BRIEF DESCRIPTION OF THE DRAWINGS

The present invention will become more fully understood from the detailed description provided hereinafter and the accompanying drawings, which are not necessarily to scale, and are given by way of illustration only, and wherein.

DESCRIPTION OF THE PREFERRED EMBODIMENT

Figure 1:
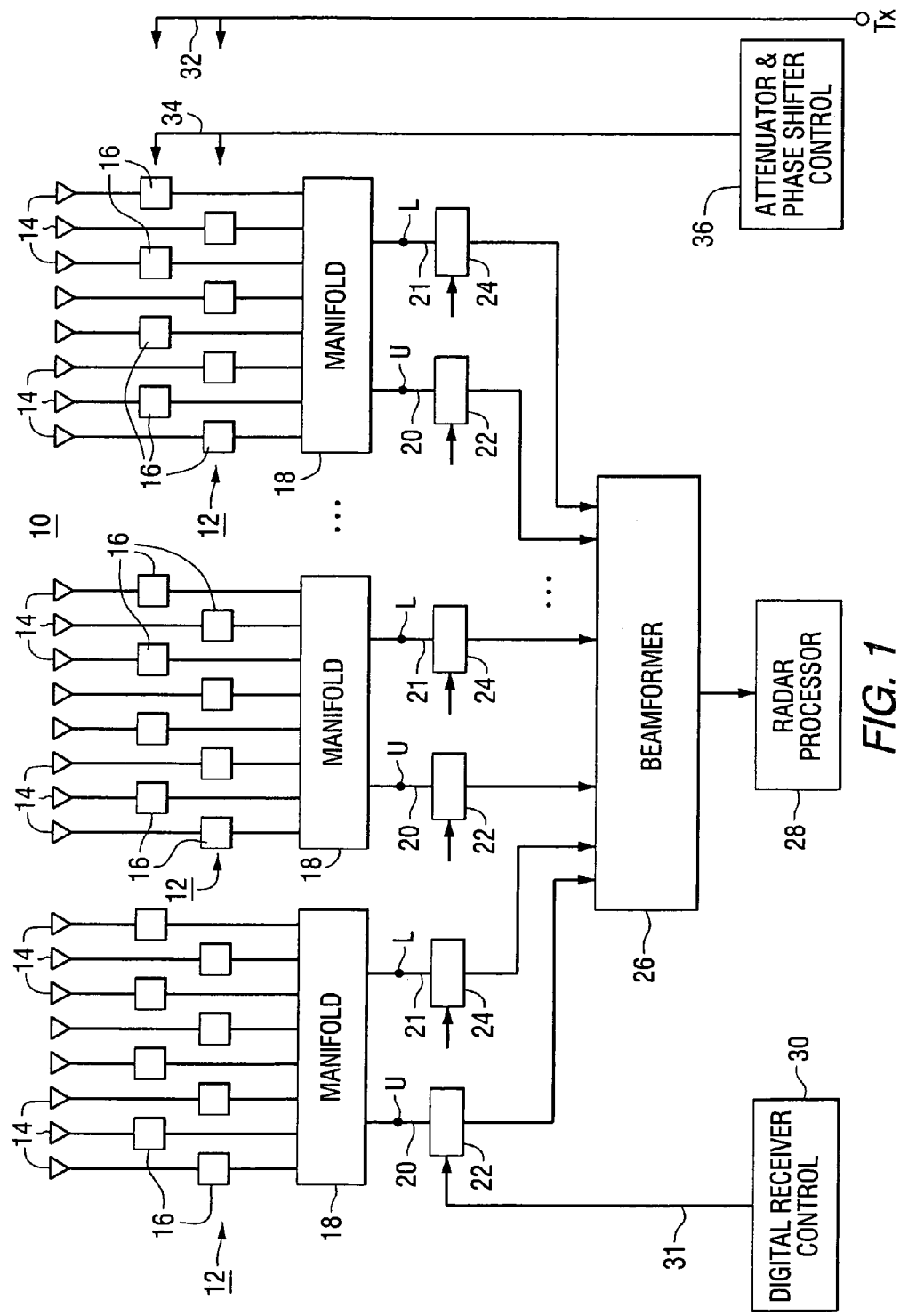
FIG. 1 is a simplified presentation of a one dimensional antenna system to explain certain principles.

The antenna system 10 of FIG. 1 includes a plurality of subarrays 12 each having a one dimensional line array of antenna elements 14. All of the subarrays are identical and a typical subarray 12 includes antenna circuitry 16 connected to each antenna element, with each antenna circuitry 16 being connected to a manifold 18. Manifold 18 provides first and second output signals at respective U and L output ports 20 and 21. These first and second output signals are operated on by respective digital receivers 22 and 24, the collective outputs of which are provided to a digital beamformer 26. A radar processor 28 utilizes the beam signals provided by the digital beamformer 26 to, for example, track a particular target or targets.

Each digital receiver 22 or 24 basically converts the RF manifold signal, which is produced in response to combining the antenna output signals as a result of a radar return, from an analog to a digital signal. In addition, the digital receivers are also operative to modify the amplitude of the manifold signal applied to them, by application of a weighting function. The weighting function information, which may be different for the various digital receivers, is provided to each digital receiver by the digital receiver control circuit 30 via lines 31.

The antenna system of the present invention may be a passive receive only system, or it may be a part of a radar system which also transmits a radar pulse. If the latter, then a transmit pulse is provided to the antenna elements 14 of each subarray 12 via transmit lines 32 and via antenna circuitry 16, which would be constituted by a T/R module.

Figure 2:
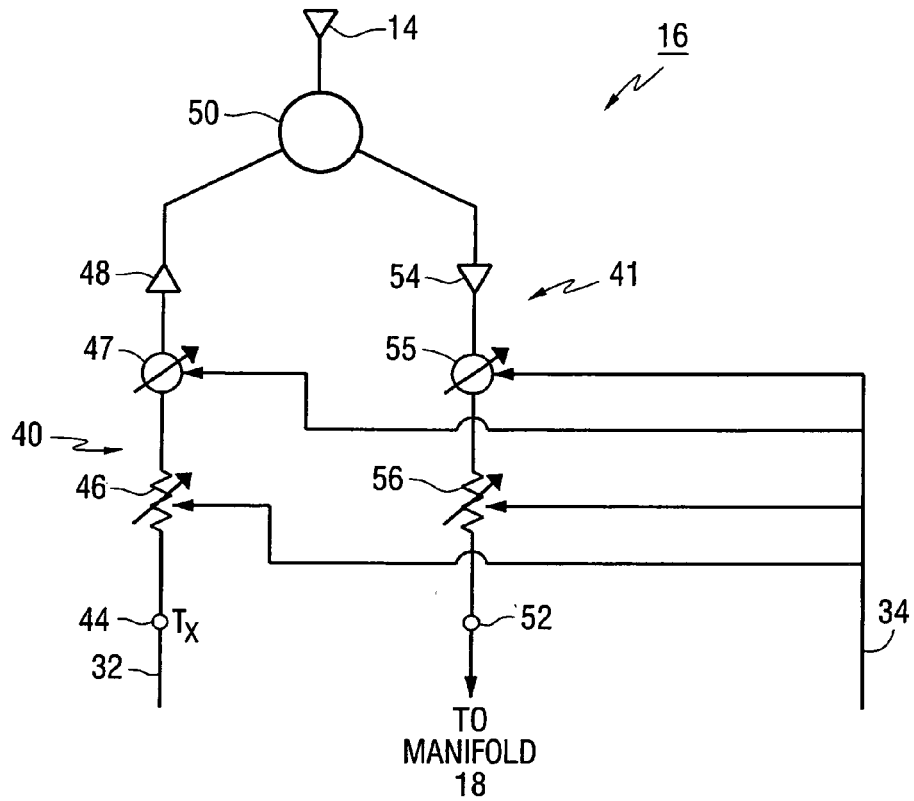
FIG. 2 is a more detailed view of a T/R (transmit/receive) component of FIG. 1.

As will be seen, the antenna circuitry, or T/R module 16 includes components which receive certain control signals via control lines 34 from attenuator and phase shifter control 36. A typical T/R module 16 is illustrated in FIG. 2. The T/R module 16 includes a transmit channel 40 and a receive channel 41. A transmit pulse at input 44 is provided to the antenna element 14 via adjustable attenuator 46, adjustable phase shifter 47, power amplifier 48 and circulator 50.

The antenna element 14 provides a receive signal as a result of a radar return and this antenna signal is provided to output 52 via circulator 50, low noise amplifier 54, adjustable phase shifter 55, and adjustable attenuator 56.

Figure 3:
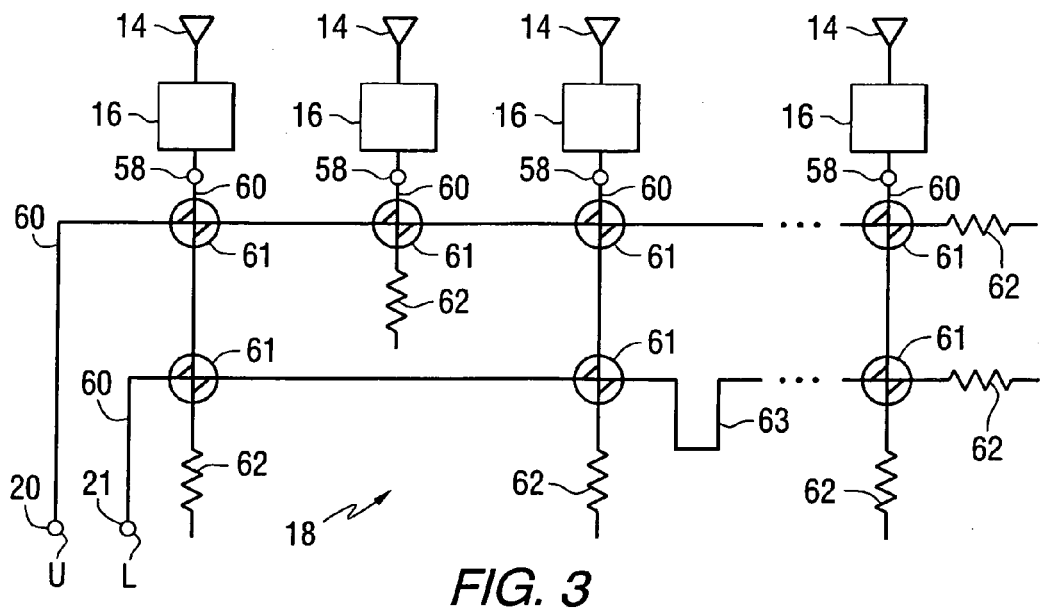
FIG. 3 illustrates a manifold component of FIG. 1.

A typical end fed manifold 18 is illustrated in more detail in FIG. 3. Manifold 18 includes a plurality of input ports 58 for receiving the respective antenna element signals from T/R modules 16. Transmission lines 60 are included, with signals being coupled between transmission lines by means of a plurality of four-port couplers 61 arranged in a cascaded series geometry. The arrangement additionally includes termination resistors 62 and at least one delay line section 63 which provides 180° phase shift. Horizontal transmission lines 60 terminate in respective output ports 20 and 21. This type of manifold was developed by Alfred E. Blass and is sometimes known as a Blass RF circuit, various designs of which are well-known to those skilled in the art. Other manifold topologies, for example, center fed and equal path corporate fed manifolds can also be considered for the typical manifold 18.

Figure 3A:
FIGS. 3A and 3B are waveforms associated with FIG. 3.

Operation of the manifold 18 may best be understood by application of the reciprocity theory. That is, if a voltage is applied to output port 20, the design of the manifold 18 is such that a voltage distribution appears across the array of antenna elements 14 as illustrated in FIG. 3A. For this case, in response to the input voltage at output port 20, the left most antenna element 14 produces a voltage of +V and each subsequent antenna element 14 provides the same voltage +V so that the curve of FIG. 3A is uniform, hence the U designation for this port 20.

Figure 3B:
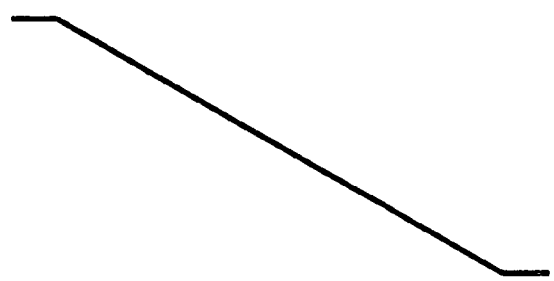

If a voltage is applied to the other output port 21, the design of the manifold 18 is such that a voltage distribution appears across the array of antenna elements 14 as illustrated in FIG. 3B. For this case, in response to the input voltage at output port 21, the left most antenna element 14 produces a voltage of +V and each subsequent antenna element 14 provides a progressively smaller voltage with the right most antenna element 14 producing a voltage of −V. The curve of FIG. 3B is linear (with a slope), hence the L designation for this port 21.

Referring once again to FIG. 1, all of output signals at the U output ports 20 of all of the manifolds 18 are operated upon by respective digital receivers 22, and all of output signals at the L output ports 21 of all of the manifolds 18 are operated upon by respective digital receivers 24. The digital receiver outputs are provided to the digital beamformer 26 which produces a Σ, or sum beam and a Δ, or difference beam.

Figure 4:
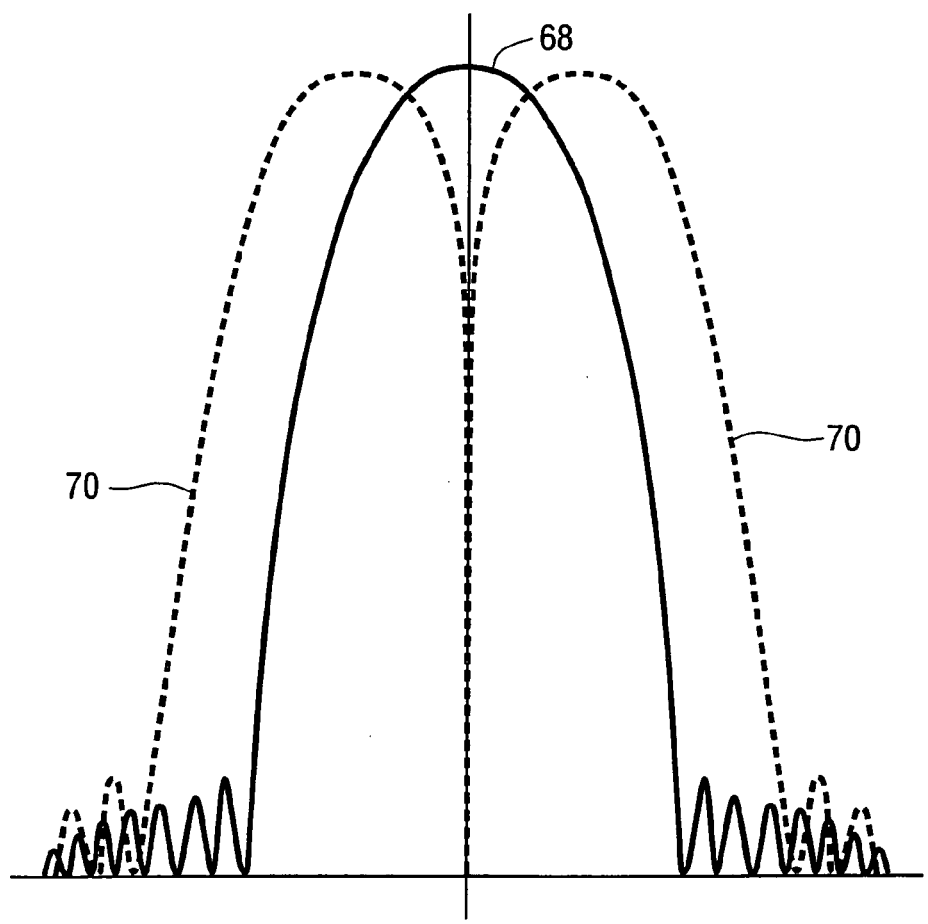
FIG. 4 illustrates sum and difference antenna beams.

A sum beam 68 is shown in solid line in FIG. 4, and a difference beam 70 is shown dotted. It is to be noted that the width of the beams are greatly exaggerated so that the two beams may be readily seen. A typical sum beamwidth may actually be on the order of ±1° at the 3 dB points.

A one-dimensional antenna element line array has been described for purposes of illustration. In actuality, a practical antenna system will have two antenna elements 14 in two dimensions for tracking targets in space. A two dimensional antenna 80 for such system is illustrated in FIG. 5.

The antenna 80, shown circular by way of example, is comprised of a plurality of identical subarrays 82, each having a two-dimensional array of N antenna elements 14. In accordance with the concept of a thinned array, subarrays within a core 84 are fully populated with antenna elements 14 providing output signals which are subject to further signal processing.

However, predetermined antenna elements 14 in subarrays surrounding the core 84, in a peripheral area 86, are disabled so as not to contribute to any further signal processing operations. That is, all N antenna elements 14 of core 84 subarrays are utilized for beamforming while less than N antenna elements 14 of predetermined peripheral subarrays 86 are utilized. The active antenna elements 14 participating in the beamforming operation are indicated by the small black dots in FIG. 5. Thinned arrays are well-known and in addition to significantly lowering the cost of the antenna system, they also reduce beam sidelobe levels.

Figure 5:
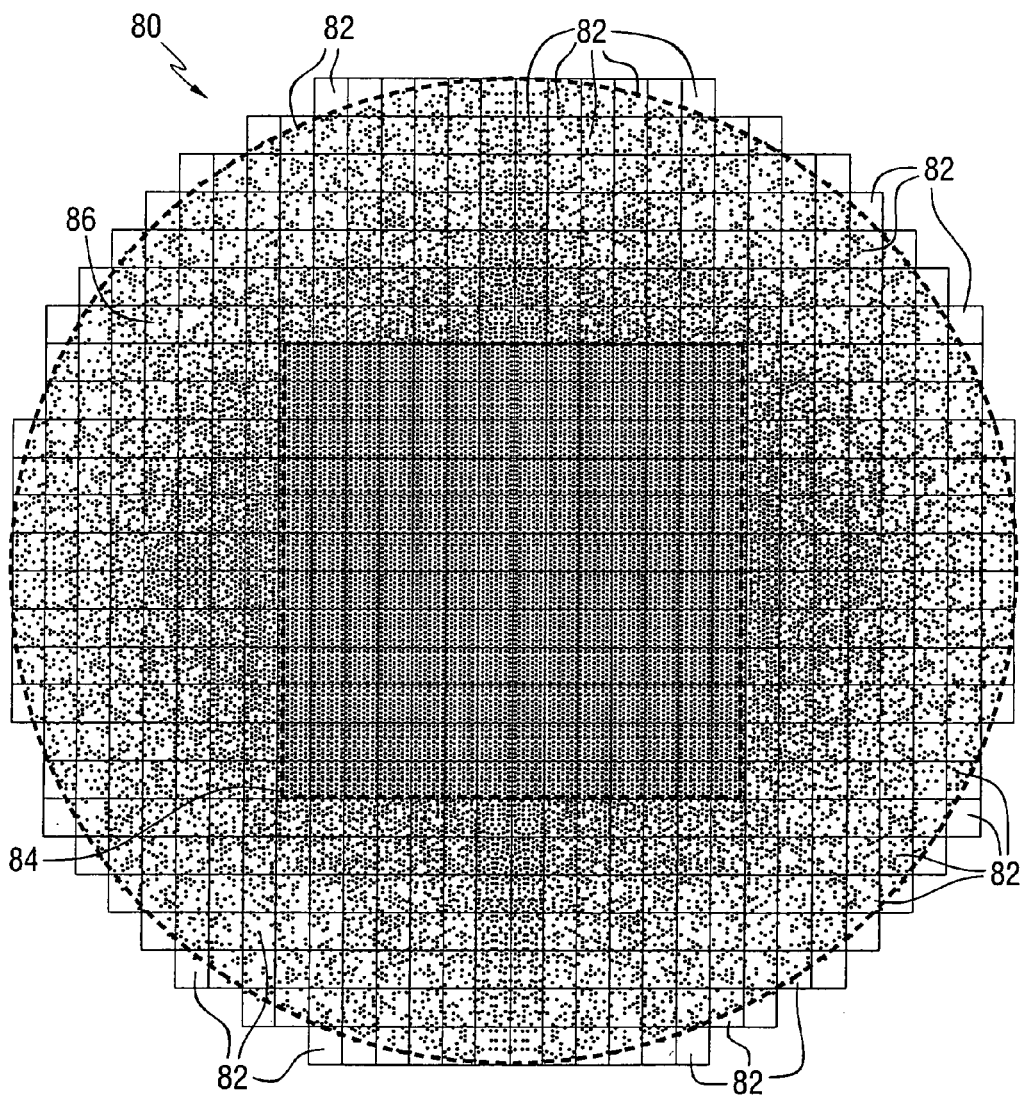
FIG. 5 is a presentation of a two dimensional antenna array.
Figure 6:
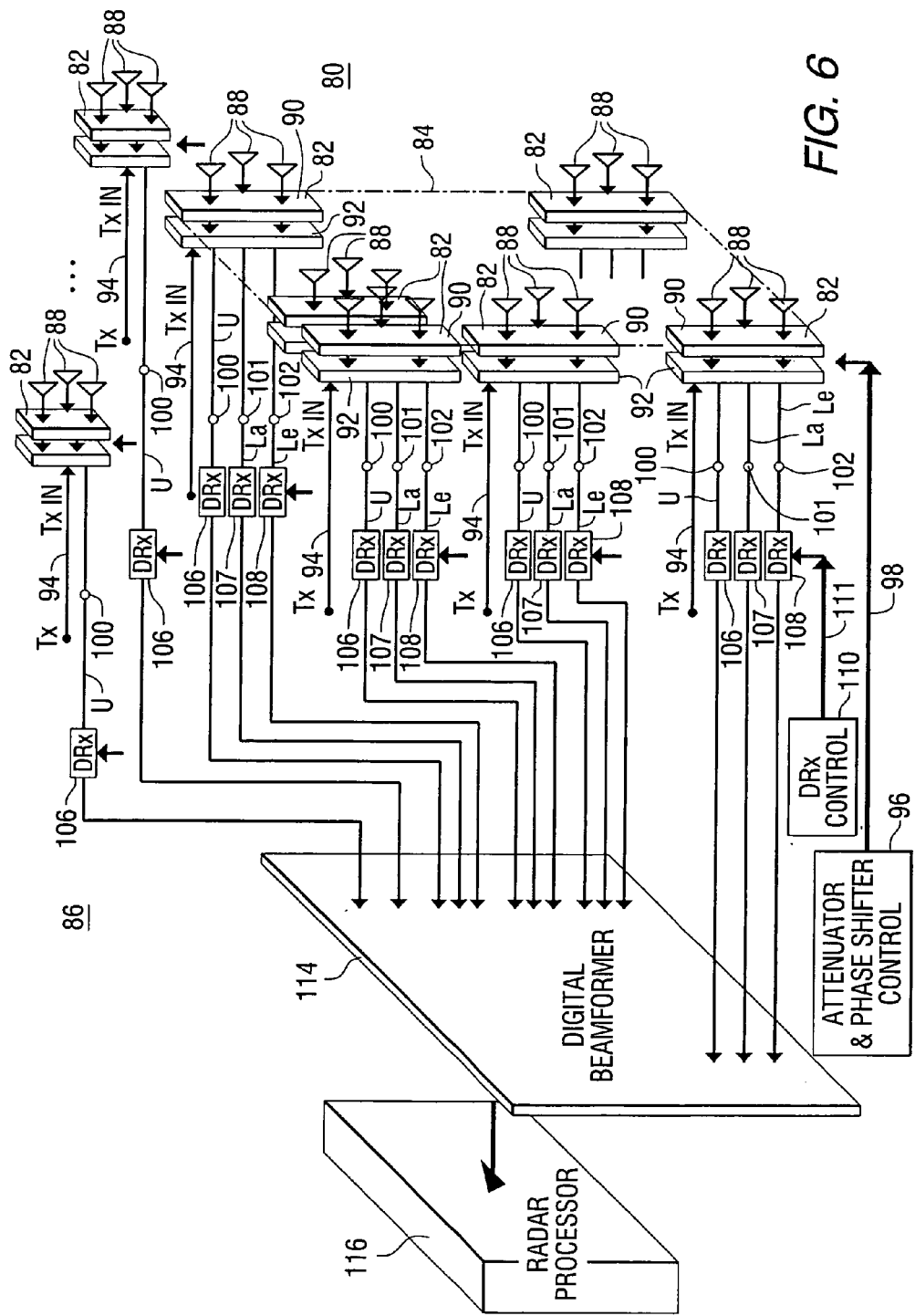
FIG. 6 is a block diagram of one embodiment of the present invention.

FIG. 6 is a block diagram of an antenna system utilizing the antenna 80 of FIG. 5, in accordance with one embodiment of the present invention. The illustrated antenna system includes a plurality of subarrays 82 within core 84, as well as subarrays 82 in the peripheral area 86, some of which are shown. Each subarray 82 includes antenna elements 14 connected to antenna circuitry 90, the outputs of which are provided to a respective manifold 92. If the antenna is part of a radar system which also transmits, then, with N antenna elements 14 per subarray, the antenna circuitry 90 would be constituted by N T/R modules, similar to that shown in FIG. 2, and a transmit pulse would be supplied via lines 94. An attenuator and phase shifter control circuit 96 supplies control signals to the antenna circuitry 90 via lines 98.

Manifolds 92 of the core 84 subarrays respectively provide three output signals at three output ports, a U output port 100, an $L_A$ output port 101 and an $L_E$ output port 102. Manifolds 92 within the peripheral area 86 provide only outputs at the U output ports 100, since adequate beam formation may be achieved without the additional $L_A$ and $L_E$ outputs from these latter subarrays. All of the U outputs are utilized to form a Σ, or sum beam, all of the U outputs along with all of the $L_A$ outputs are utilized to form a $\Delta_{AZ}$, or azimuth difference beam and all of the U outputs along with all of the $L_E$ outputs are utilized to form a $\Delta_{EL}$, or elevation difference beam. The Σ and $\Delta_{AZ}$ beams would be similar to beams 68 and 70 of FIG. 4, while the $\Delta_{EL}$ would be as curve 70, except rotated by 90°, these beams being in three dimensions.

The U, $L_A$ and $L_E$ outputs from the manifolds 92 of the core subarrays are provided to respective digital receivers 106, 107 and 108 while the peripheral subarrays utilize only a single digital receiver 106 for the U output. Appropriate weighting values are supplied to the digital receivers by means of digital receiver control 110 and lines 111.

The output signals from all of the digital receivers 106, 107 and 108 are provided to digital beamformer 114 for formation of the Σ, $\Delta_{AZ}$ and $\Delta_{EL}$ beams which are used by the radar processor 116 to track a particular target or targets. The signal processing performed by the digital receivers further, reduces unwanted beam side lobes more than that accomplished with thinning alone. The Σ and Δ beams as described herein are an example of the types of radar beams possible with the present invention. It should be noted that other beams are possible given the degrees of freedom provided by the digital receivers 106, 107 and 108.

Figure 7:
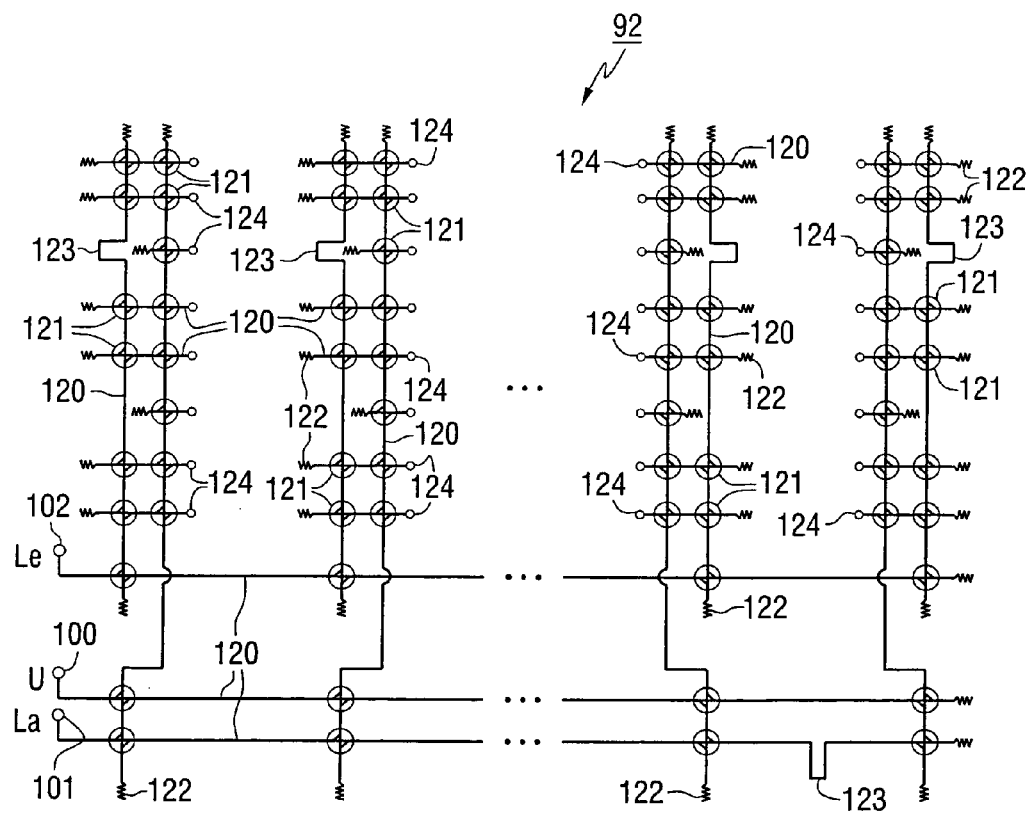
FIG. 7 illustrates a manifold component of FIG. 6.

A typical manifold 92 is illustrated in more detail in FIG. 7. Manifold 92 is an end fed, series arranged Blass RF circuit which includes a plurality of transmission lines 120 with signals being coupled between transmission lines by means of a plurality of four-port couplers 121. The arrangement additionally includes termination resistors 122 and a plurality of 180° delay line sections 123. Antenna signals (via the T/R modules) are applied to the manifold 92 at respective inputs 124. The antenna signals are combined in the manifold 92 such that the top most transmission line provides the $L_E$ output, the middle line, the U output and the bottom line, the $L_A$ output. Manifolds for peripheral subarrays could be identical just using the U output of the three outputs, or they may be designed to just provide a U output alone.

Figure 7A:
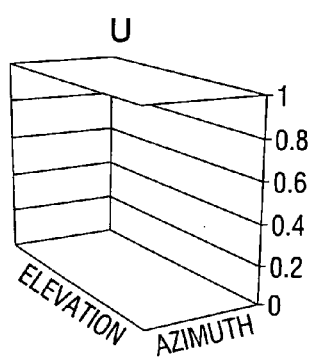
FIGS. 7A, 7B and 7C are waveforms associated with FIG. 7.
Figure 7B:
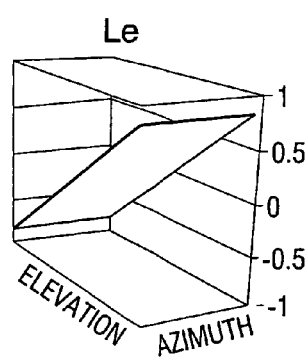
Figure 7C:
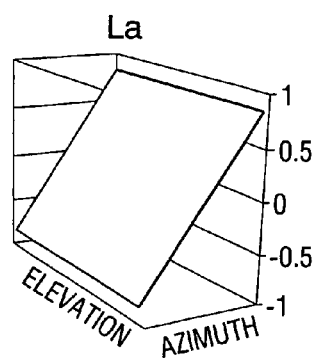

The design of manifold 92 may be explained by again applying the reciprocity theory. That is, if a voltage is applied to the U output port 100, the manifold design is such that a uniform voltage distribution appears across all N antenna elements, as illustrated in FIG. 7A. If that same voltage is applied to $L_E$ output port 102, the voltage distribution across the antenna elements would be linear (and sloping) as in FIG. 7B, and FIG. 7C illustrates the voltage distribution for the voltage applied to the $L_A$ output port 101.

Figure 8A:
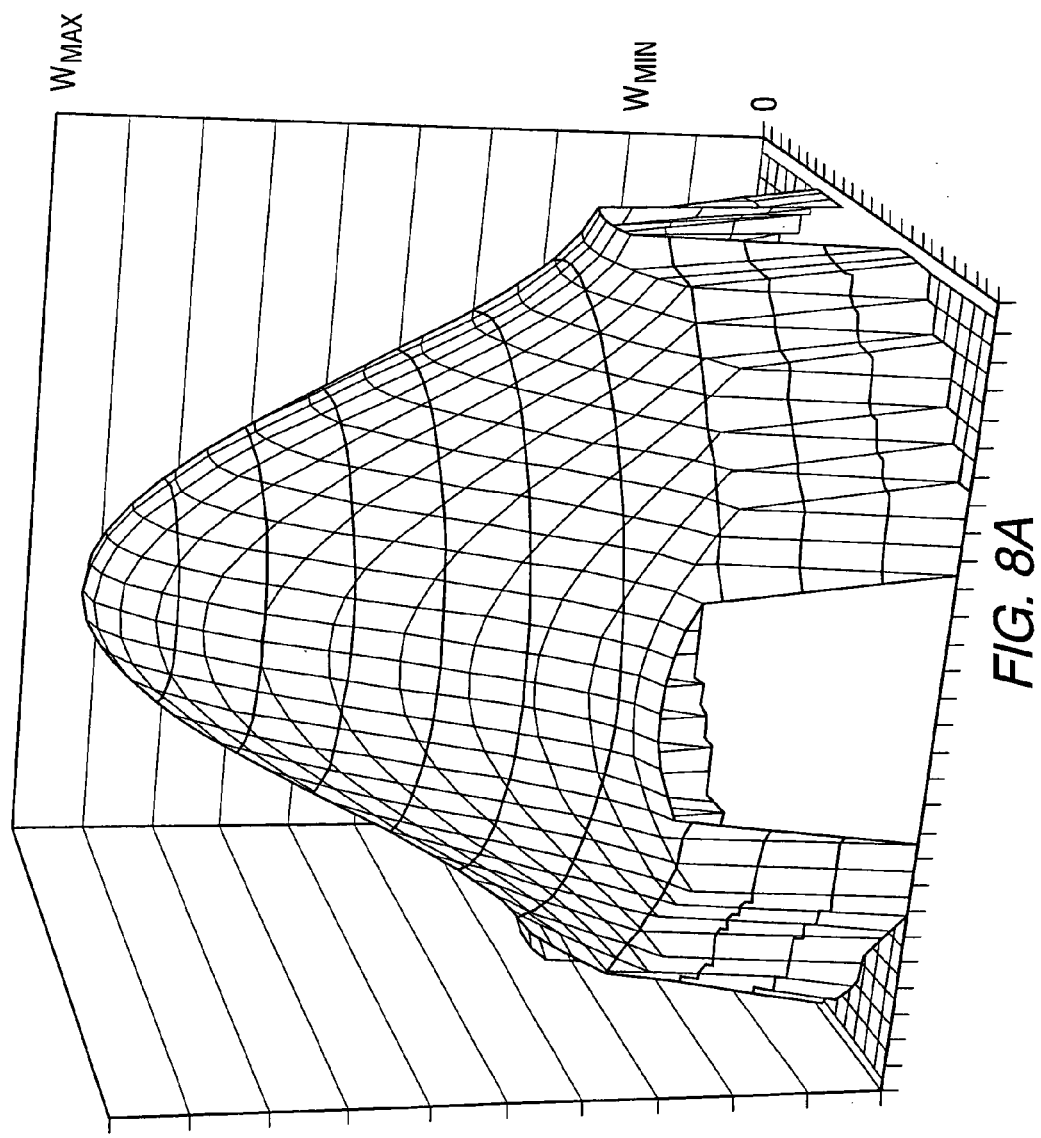
FIGS. 8A to 8E illustrate certain digital weighting functions.

The weighting function distribution for performing the beamforming operation is illustrated in FIGS. 8A to 8E. As shown in FIG. 8A the weighting function is that as applied to all of the digital receivers 106 of the entire array for calculating the Σ beam. The weighting function has a minimum value near zero and a maximum value of $W_{MAX}$.

Figure 8B:
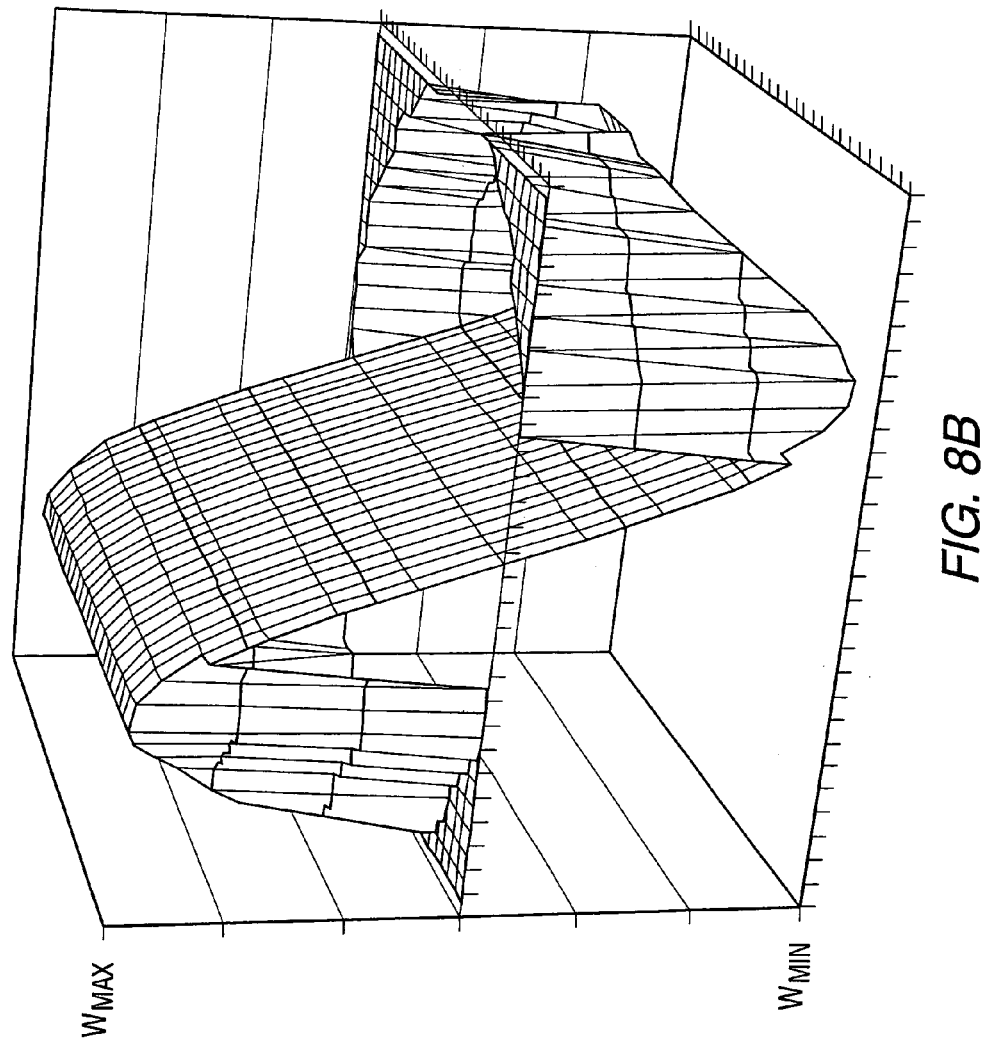
Figure 8C:
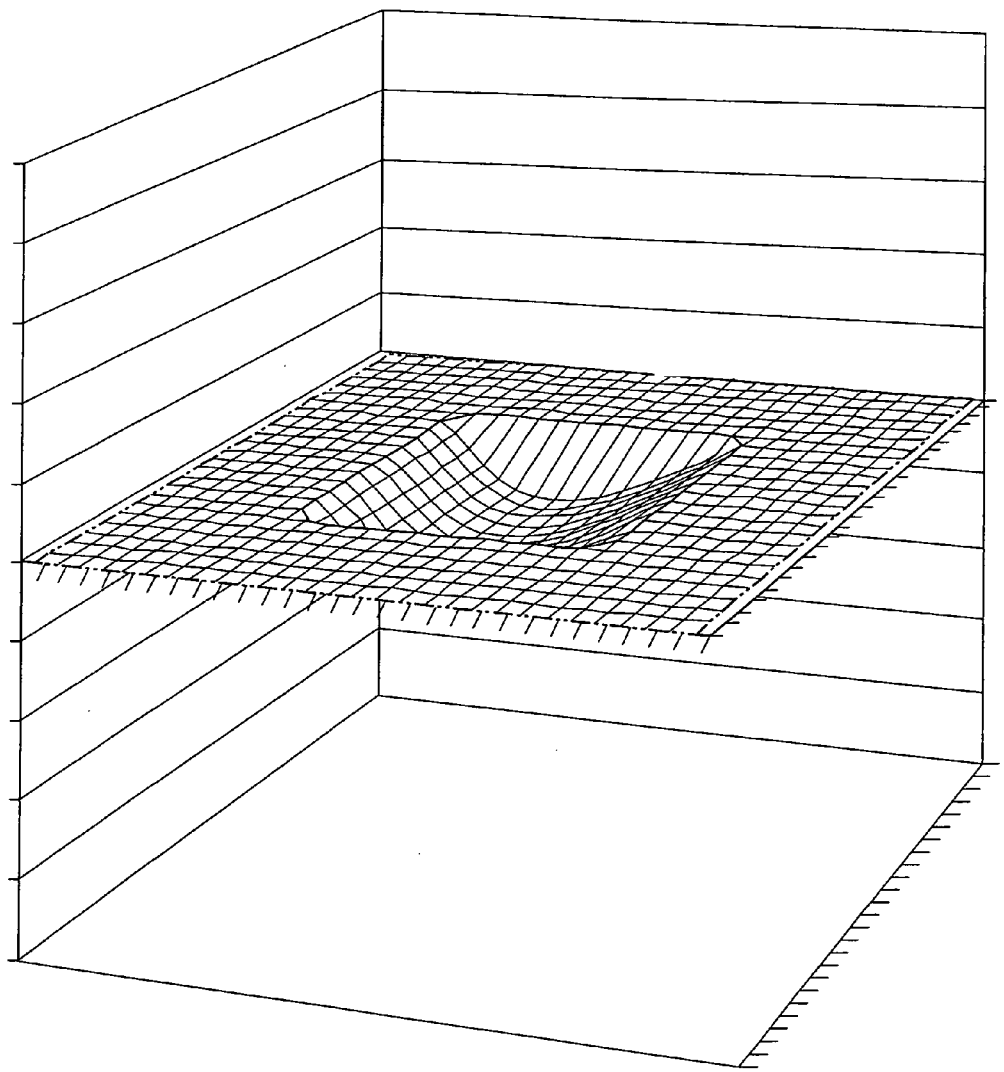

FIG. 8B shows the weighting function distribution, which in conjunction with the weighting function distribution of FIG. 8C, is utilized for calculating the $\Delta_{AZ}$ beam. The weighting function of FIG. 8B, having a maximum value of $W_{MAX}$ and a minimum value of $W_{MIN}$, is applied to all of the U digital receivers 106, while the weighting function of FIG. 8C is that applied to all $L_A$ digital receivers 107 within core 84.

Figure 8D:
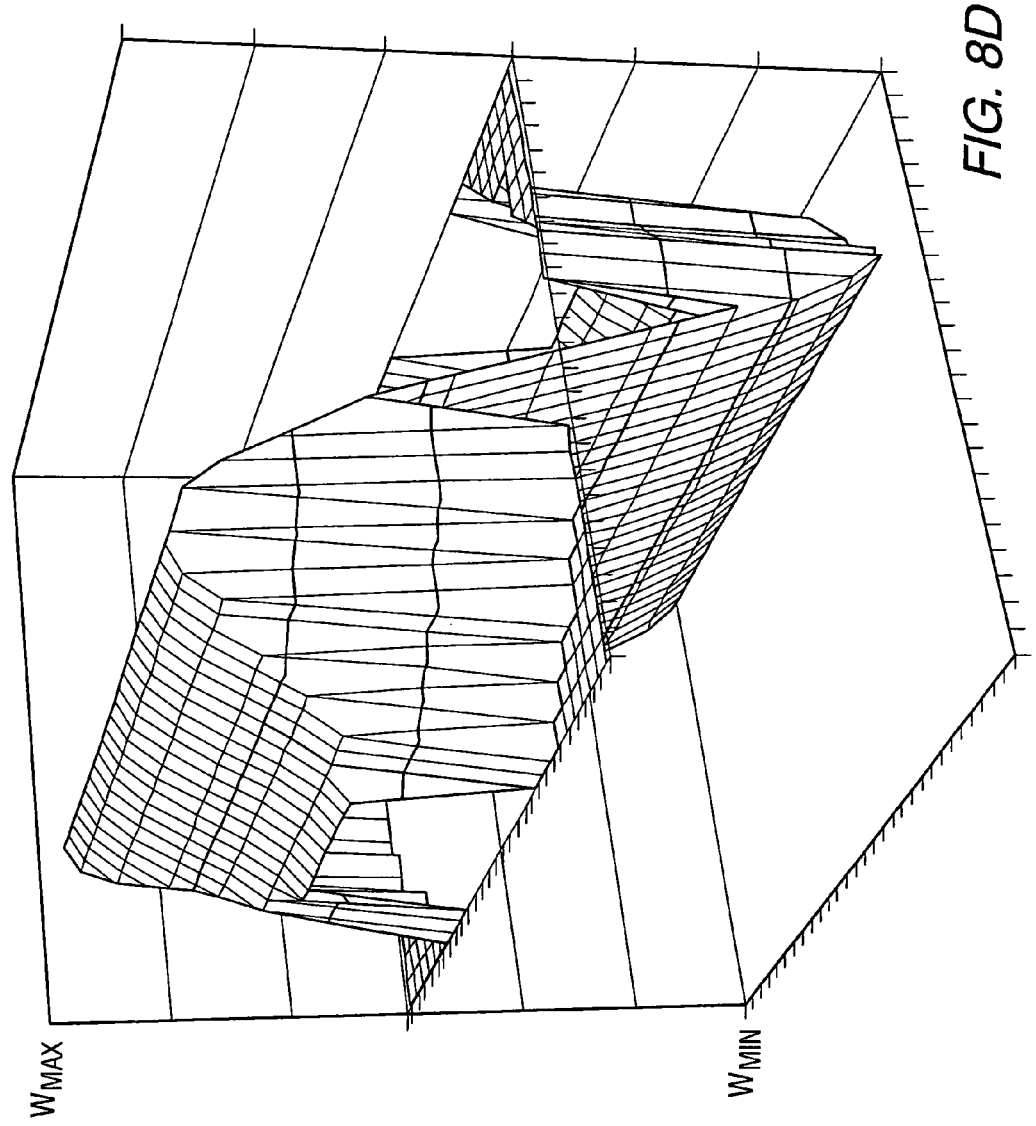
Figure 8E:
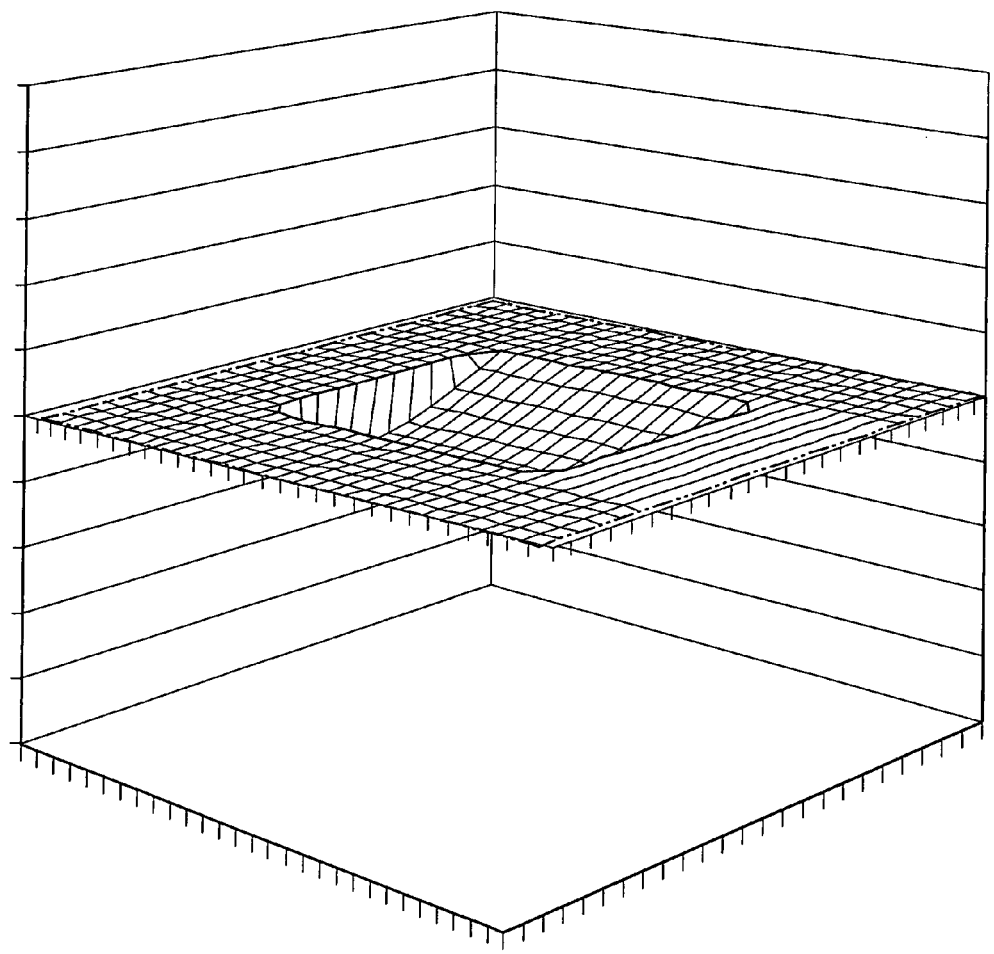

FIG. 8D shows the weighting function distribution, which in conjunction with the weighting function distribution of FIG. 8E, is utilized for calculating the $\Delta_{EL}$ beam. The weighting function of FIG. 8D, having a maximum value of $W_{MAX}$ and a minimum value of $W_{MIN}$, is applied to all of the U digital receivers 106, while the weighting function of FIG. 8E is that applied to all $L_E$ digital receivers 108 within core 84.

The foregoing detailed description merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. A thinned antenna array system comprising:
   an antenna having a plurality of core subarrays and a plurality of peripheral subarrays surrounding said core subarrays;
   each said subarray including N antenna elements operable to provide respective output signals in response to impingement of a radar return;
   all N of said antenna elements of said core subarray being active to participate in further signal processing;
   less than N of said antenna elements of predetermined ones of said peripheral subarrays being active to participate in further signal processing;
   each said subarray including a manifold for receiving and combining the antenna signals from said active antenna elements;
   all of said manifolds of all of said subarrays providing at least a first output signal in response to said antenna signals from said active antenna elements;
   only said manifolds of said core subarrays additionally providing second and third output signals in response to said antenna signals from said active antenna elements;
   a plurality of first, second and third digital receivers;
   a digital receiver control circuit for providing predetermined weighting functions to said plurality of digital receivers
   each said first digital receiver being connected to receive a said weighting function and said first output signal from a said manifold to provide a first digital receiver output signal;
   each said second digital receiver being connected to receive a said weighting function and said second output signal from a said manifold to provide a second digital receiver output signal;
   each said third digital receiver being connected to receive a said weighting function and a said third output signal from a said manifold to provide a third digital receiver output signal;
   a digital beamformer responsive to all of said output signals from said plurality of first digital receivers to generate a sum beam;
   said digital beamformer being responsive to all of said output signals from said plurality of first digital receivers, as well as to all of said output signals from said plurality of second digital receivers to generate an azimuth difference beam;
   said digital beamformer being additionally responsive to all of said output signals from said plurality of first digital receivers, as well as to all of said output signals from said plurality of third digital receivers to generate an elevation difference beam; and
   a radar processor for processing said sum, azimuth difference and elevation difference beams.

2. A system as in claim 1 wherein:
   said antenna is circular.

3. A system as in claim 1 wherein:
   said core is square.

4. A system as in claim 1 which includes:
   antenna circuitry for modifying each said antenna signal.

5. A system as in claim 4 wherein:
   said system is part of a radar system which also transmits a radar signal; and wherein
   said antenna circuitry is a T/R module.

* * * * *